United States Patent [19]

Underwood

[11] Patent Number: 5,479,741

[45] Date of Patent: Jan. 2, 1996

[54] VEGETATION MAINTENANCE SYSTEM

[76] Inventor: John P. Underwood, 42 West Vogel, Phoenix, Ariz. 85021

[21] Appl. No.: 210,681

[22] Filed: Mar. 18, 1994

Related U.S. Application Data

[60] Continuation-in-part of Ser. No. 112,573, Aug. 25, 1993, abandoned, which is a division of Ser. No. 729,185, Jul. 12, 1991, Pat. No. 5,245,878.

[51] Int. Cl.$^6$ ..................................................... A01G 13/00
[52] U.S. Cl. .................................. 47/30; 47/24; 24/20 EE
[58] Field of Search .................................... 47/30 OT, 23, 47/24; 24/20 EE, 16 PB

[56] References Cited

U.S. PATENT DOCUMENTS

| | | | |
|---|---|---|---|
| 3,501,814 | 3/1970 | Anderson | 24/16 PB |
| 3,955,246 | 5/1976 | Tanaka | 24/16 PB |
| 4,995,192 | 2/1991 | DeWild | 47/30 OT |
| 5,222,325 | 6/1993 | Angus | 47/30 OT |
| 5,347,750 | 9/1994 | Mills | 47/30 OT |

FOREIGN PATENT DOCUMENTS

| | | | |
|---|---|---|---|
| 1488408 | 6/1967 | France | 24/16 PB |
| 3542743 | 1/1987 | Germany | 47/30 OT |

*Primary Examiner*—Henry E. Raduazo
*Attorney, Agent, or Firm*—Parsons & Associates; Don J. Flickinger; Robert A. Parsons

[57] ABSTRACT

A guard for protecting a plant, including a sheet of semi-rigid material having a top edge, a bottom edge, a first end extending between said top and bottom edges, and a second end spaced from said first end fastening means formed on said sheet for fastening said first end in overlapping relationship with said second end to form a tubular sheath for surrounding said plant.

6 Claims, 2 Drawing Sheets

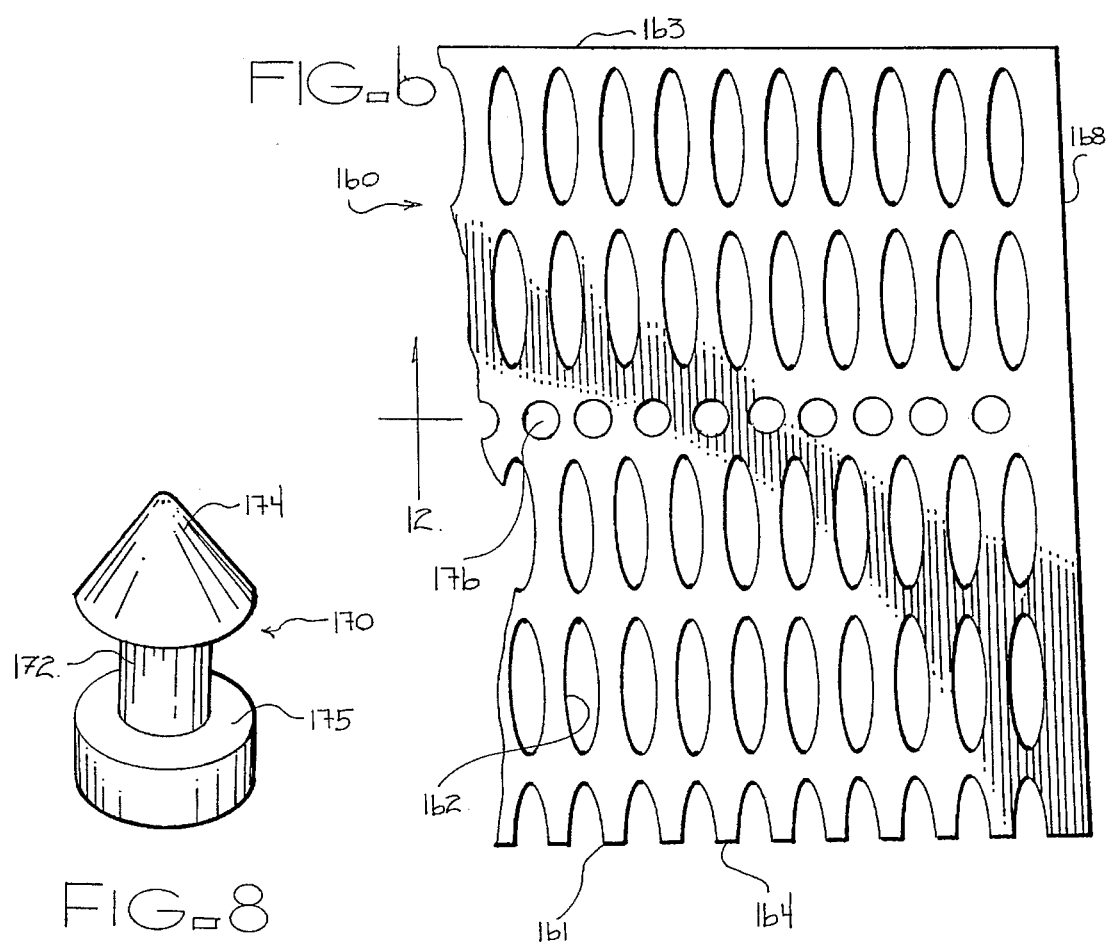
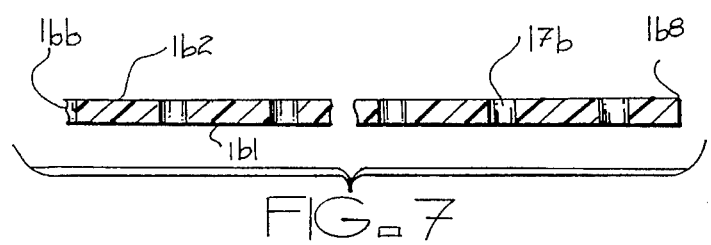
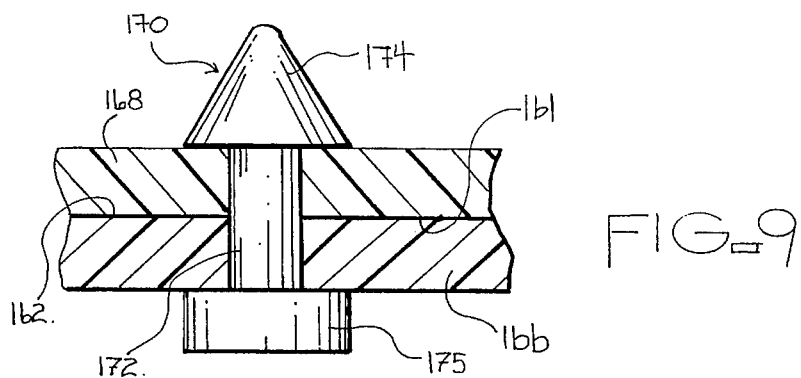

VEGETATION MAINTENANCE SYSTEM

CROSS REFERENCE TO RELATED APPLICATION

This application is a continuation in part of application Ser. No. 08/112,573, entitled VEGETATION MAINTENANCE SYSTEM, filed 25 Aug. 1993, and now abandoned, which in turn is a division of application Ser. No. 07/729,185 entitled VEGETATION MAINTENANCE SYSTEM, filed 12 Jul. 1991, which issued on 21 Sep. 1993 as U.S. Pat. No. 5,245,878.

BACKGROUND OF THE INVENTION

1. Field of the Invention

This invention relates to the art of landscape maintenance.

More particularly, this invention relates to a system for ensuring the healthy growth of vegetation such as trees.

In a further and more specific aspect, the instant invention concerns a landscape maintenance system including a guard for protecting plants from string trimmers and the like.

2. Description of the Prior Art

The survival of young plants, such as trees, shrubs, vegetables, and flowers, is dependent on a large number of environmental factors. Among such factors are the quality of the soil in which the plants are established, the amount of water and nutrients available, and the presence or absence of protection from externally inflicted damage by humans and/or animals. Constant, careful maintenance is required to control these factors if the good health and longevity of the plants is to be ensured.

A complete plant maintenance program consists of three major components. First, the soil must be tested to determine its quality, or to diagnose any deficiencies which may prevent a plant from flourishing. Second, the soil must be enhanced by adding water, nutrients, and any other additives needed to remedy whatever deficiencies have been identified. Third, the plant and its environment must be protected from outside damage. Different tools are utilized for each of these components of a plant maintenance system.

The sampling and analysis component of a plant maintenance program is commonly performed with the aid of a sampler comprising an elongated tubular member secured to an elongated shaft having a T-handle. The bottom end of the tubular member is provided with a sharpened edge or point for penetrating the ground. To extract a soil sample, a user drives the tubular member into the ground by bearing down on the T-handle. Soil then enters the sampler through a longitudinal opening in the tube, forming a plug. After the sampler is withdrawn from the ground, the plug is shaken, knocked or scraped from the tube as necessary.

Prior art sampling devices have suffered from a number of disadvantages. For example, many devices require excessive force for driving the sample tube into the ground and subsequently pulling it out again, particularly when the ground is hard. This can result in bodily injuries to the user. In addition, most sampling devices lack any type of provision for completely ejecting a plug from the tube. Thus, portions of old soil plugs may mix with and contaminate the most recent plug, making accurate analysis impossible.

The soil enhancement component of a plant maintenance program requires a variety of tools for penetrating the soil and delivering nutrients as close as possible to the feeder roots of a plant. Such tools include spades, shovels, and boring devices for digging to the appropriate depth, and pipes, hoses, and other conduits for delivering water and nutrients once that depth has been reached.

Prior art boring and digging devices have suffered from many of the same deficiencies as the sampling devices. Namely, excessive force is required to penetrate the soil. In addition, the length of most devices is either too short for plants with very deep root systems, or too long for plants with shallow root systems, or both. It is therefore difficult to ensure that water and nutrients are delivered to a location where they will be quickly absorbed by the roots.

The protective component of a plant maintenance system consists primarily of placing an effective barrier between the plant and any potential sources of injury. Chemical barriers are commonly used to prevent insect-inflicted injury, while physical barriers are used to prevent domestic animal and human-inflicted injury.

One way in which humans commonly damage plants is by careless use of string trimmers and similar tools. For instance, while trimming the grass near a small sapling, a maintenance worker may come too close to the sapling, allowing the line from the trimmer to strike and scar the base of the plant. Other damage may come from household pets who dig and paw around the stems of plants. This type of damage is avoided by erecting a guard at the base of the plant. Such guards not only protect the plant from string trimmers and household pets, but they may protect the pets by preventing them from ingesting chemical fertilizers or insecticides which may have been deposited near the roots of the plant.

A typical prior art plant guard consists of a sheet of flexible material which is wrapped around the plant to form a tubular sheath, and secured in place by nailing. An obvious drawback of this type of guard is that the nail itself causes injury to the plant. Another drawback is that the guards include no provision for adapting to the constantly increasing girth of the plant. Thus, it is necessary to replace each guard with a larger diameter guard as the base of the plant becomes thicker. This can become exceedingly bothersome when certain rapidly-growing species of trees are involved.

It would be highly advantageous, therefore, to remedy the foregoing and other deficiencies inherent in each of the above type of landscape maintenance tools.

Accordingly, it is an object of the present invention to provide an improved vegetation maintenance system.

Yet still another object of the invention is the provision of an improved guard member for protecting a plant.

And a further object of the invention is to provide a self-supporting plant guard which does not require the use of nails or other hardware.

And still a further object of the invention is the provision of an adjustable plant guard, the size of which can be selectively varied to accommodate a rapidly growing plant.

And yet a further object of the invention is to provide a plant guard with an outwardly tapering base for conforming to the outwardly tapering base of a tree trunk.

And yet still a further object of the invention is the provision of a plant guard with openings for allowing air and sunlight to reach the bottom of the plant.

SUMMARY OF THE INVENTION

Briefly, to achieve the desired objects of the instant invention in accordance with the preferred embodiments thereof, a vegetation maintenance system including a plant guard is provided.

The plant guard of the instant invention comprises a semi-rigid sheet of material having integrally formed fastening means for detachably securing the opposite ends of the sheet in adjustable, overlapping relationship to one another to form a tubular sheath for surrounding a plant. In a preferred embodiment, the fastening means comprise a plurality of projections provided at spaced apart locations along the mid-line of the sheet, and a plurality of apertures located in alternating relationship with the projections. The projections are snapped into the apertures to lock the sheath in a closed, upright position. A plurality of circular openings is formed in the flexible sheet to allow air and sunlight to reach the base of the plant. Semi-circular openings are formed along the bottom edge of the sheet to increase the flexibility of the bottom edge, allowing the guard to taper outwardly at its base to conform to the outwardly tapering trunk of a tree.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 6 is an enlarged, fragmentary front view of a further embodiment of a plant guard in an unrolled configuration;

FIG. 7 is a sectional view taken through line 12—12 of FIG. 6;

FIG. 8 is an enlarged perspective view showing a fastener in detail; and

FIG. 9 is an enlarged sectional side view illustrating a fastener in use on the plant guard.

DETAILED DESCRIPTION OF THE PREFERRED EMBODIMENT

Figure 1:
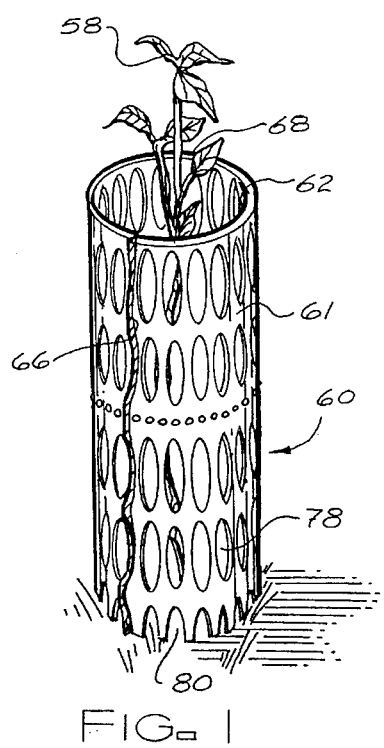
FIG. 1 is a perspective view showing a plant guard according to the present invention erected around a very young plant.

Turning now to the drawings in which like reference characters indicate corresponding elements throughout the several views, attention is first directed to FIG. 1.

Before, while, and after the soil surrounding a particular plant 58 has been analyzed and/or treated it is necessary to protect the plant and soil from externally-inflicted physical damage or the intrusion of foreign substances. At the same time, it is necessary to prevent small children and animals from touching or ingesting the potentially toxic chemicals or the like with which the soil may have treated. Both of these objectives may be achieved by surrounding the plant 58 with the plant guard 60 illustrated in FIGS. 1–5.

Figure 4:
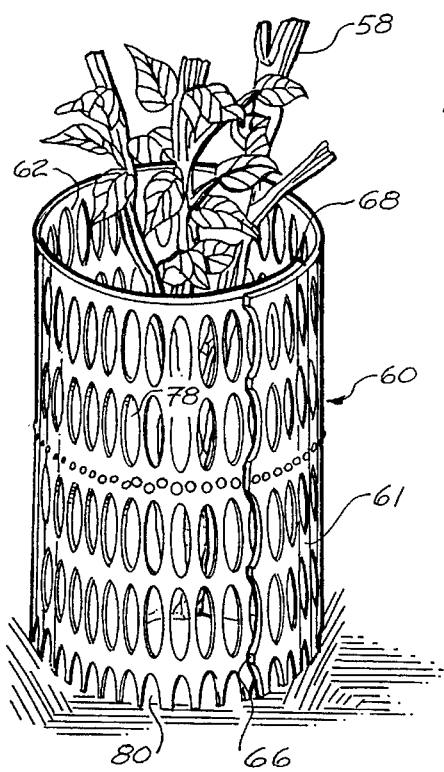
FIG. 4 is a perspective view, similar to FIG. 1, showing the plant guard with its diameter adjusted to accommodate the plant at a later stage of growth.
Figure 5:
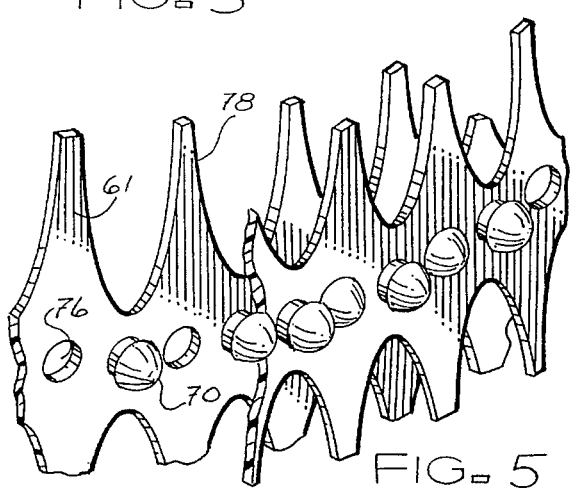
FIG. 5 is a fragmentary perspective view showing the fasteners of the plant guard in detail.

The plant guard 60 is constructed from a sheet of plastic material having a front side 61, rear side 62, top edge 63, bottom edge 64, and a pair of spaced apart ends 66, 68. The plastic material selected must have sufficient flexibility to allow the sheet to easily be rolled into tubular configuration, and yet be rigid enough to support itself in an upright position, as shown in FIGS. 1 and 4.

Figure 3:
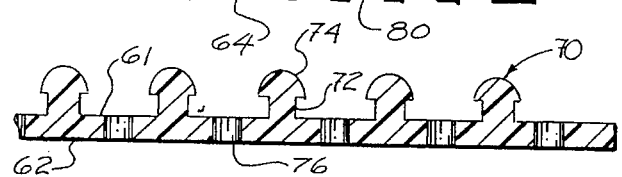
FIG. 3 is a sectional view taken through line 8—8 of FIG. 2.

A plurality of projecting members 70 are formed on the front side 61 of the sheet, along a mid-line extending parallel to the top and bottom edges 63, 64. As best seen in FIG. 3, each projecting member comprises a post 72 having an enlarged, rounded head 7 4 formed at its distal end. Alternating with the projecting members is a series of apertures 76, each having a diameter less than the base of rounded head 74, and greater than or equal to the diameter of the post 72.

Figure 2:
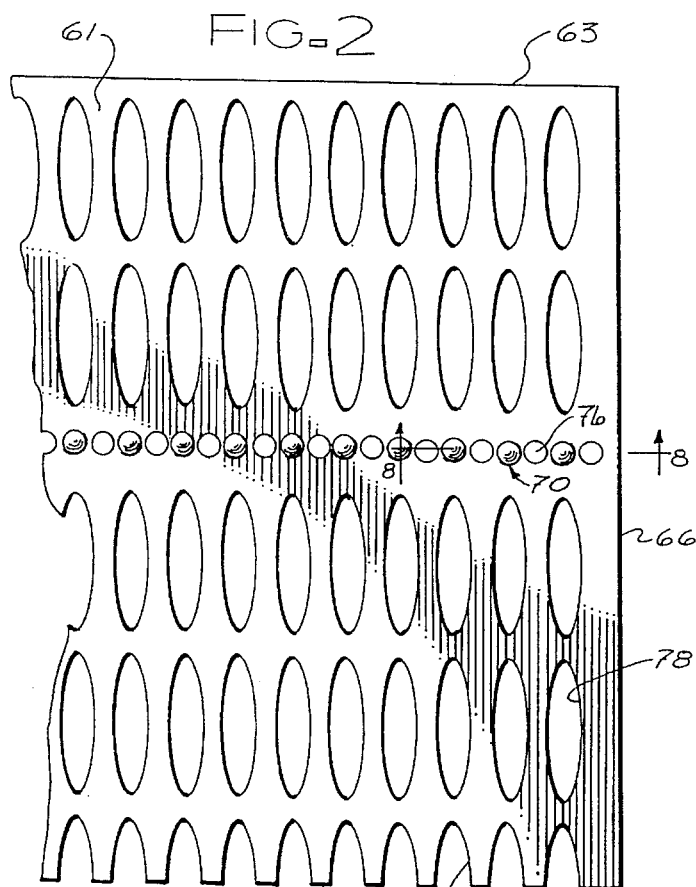
FIG. 2 is an enlarged, fragmentary front view of the plant guard of FIG. 1 in unrolled configuration.

The guard 60, originally in the flat configuration shown in FIG. 2, is formed into a tubular sheath simply by bending about a longitudinal axis and positioning the ends 66, 68 in overlapping relationship with one another, such that the rear side 62 of the first end 66 overlies the front side of the second end 68. The diameter of the sheath is determined by the amount of overlap between the two ends, with a large overlap resulting in a small diameter sheath for surrounding a very young, thin plant 58, as shown in FIG. 1, and a smaller overlap resulting in a larger diameter sheath for surrounding a thicker plant 58 (possibly the same plant at a later stage of growth), As shown in FIG. 4.

Once the ends 66, 68 have been positioned with the appropriate amount of overlap, they are locked into place by pressing a number of the projecting members 70 proximate the second end 68 through aligned corresponding apertures 76 in the overlapping portion of the first end 66. The material from which the guard 60 is constructed must be of sufficient resilience to allow each of the apertures 76 to be flexed to a large enough diameter to receive or release the enlarged head 74 of a projecting member when desired, and to automatically return to its normal diameter to retain the head 74 when release is not desired. The number of projecting members 70 in engagement with apertures 76 will correspond to the size of the overlap between the ends 66, 68. Only a few projecting members 70 and apertures 76 will be engaged in the case of a small overlap, while more projecting members 70 and apertures 76 will be engaged in the case of a large overlap.

The plant guard 60 is preferably provided with a plurality of relatively large, circular openings 78 for allowing air and sunlight to reach the base of the plant 58. The openings 78 may be arranged in a plurality of rows extending from first end 66 to second end 68 of the guard. The lowermost row preferably consists of a number of semi-circular openings 80 or other cut-outs which open along the bottom edge 64 of the guide. The semi-circular, or open, configuration of the openings 80 increases the flexibility of the bottom edge 64, so that the guard 60 can expand or bulge outwardly near its base to conform to the outward taper of a tree trunk.

A further embodiment of a plant guard, generally designated 160, is illustrated in FIGS. 6–9. Referring specifically to FIG. 6, plant guard 160 is substantially similar to plant guard 60, and is constructed from a sheet of plastic material having a front side 161, rear side 162, top edge 163, bottom edge 164, and a pair of spaced apart ends 166, 168. The plastic material selected must have sufficient flexibility to allow the sheet to easily be rolled into tubular configuration, and yet be rigid enough to support itself in an upright position in a manner similar to plant guard 60 shown in FIGS. 1 and 4.

With additional reference to FIG. 7, a plurality of apertures 176 are formed through the sheet, along a mid-line extending parallel to the top and bottom edges 163, 164. Plant guard 160 differs from plant guard 60 in that apertures 176 are not interspersed with projecting members 70. Instead, fasteners 170, separate from the sheet, are provided.

As best seen in FIG. 8, each fastener 170 comprises a post 172 having an enlarged, conical head 174 formed at one end and an enlarged flattened head 175 formed at the opposing end. Apertures 176 are formed such that each has a diameter less than the base of conical head 174, and greater than or equal to the diameter of post 172. In other characteristics, plant guard 160 is substantially identical to plant guard 60.

Guard 160, originally in the flat configuration shown in FIG. 6, is formed into a tubular sheath simply by bending about a longitudinal axis and positioning ends 166, 168 in overlapping relationship with one another, such that the rear side 162 of the first end 166 overlies the front side 161 of the second end 168. As was the case with Embodiment 60, the diameter of the sheath is determined by the amount of overlap between the two ends, with a large overlap resulting in a small diameter sheath, and a smaller overlap resulting in a larger diameter sheath.

Once the ends 166, 168 have been positioned with the appropriate amount of overlap, they are locked into place by pressing a number of fasteners 170 through aligned corresponding apertures 176 in the overlapping portions of ends 166 and 168. As can be seen with reference to FIG. 9, when fastener 170 is in place, conical head 174 engages rear side 162 of second end 168 and flattened head 175 engages front side 161 of first end 166. The material from which the guard 160 is constructed must be of sufficient resilience to allow each of the apertures 176 to be flexed to a large enough diameter to receive or release the enlarged conical head 174 of a fastener 170 when desired, and to automatically return to its normal diameter to retain conical head 174 when release is not desired. The number of projecting members 170 in engagement with apertures 176 will correspond to the size of the overlap between the ends 166, 168. Generally, fewer fasteners 170 and apertures 176 will be employed in the case of a small overlap, while more fasteners 170 and apertures 176 will be employed in the case of a large overlap. One skilled in the art will understand that each set of overlapping apertures may receive a fastener 170, but that less fasteners dispersed along the overlap will be sufficient. In an extreme example, a single fastener 170 may satisfactorily couple ends 166 and 168, however additional fasteners would ensure a more secure coupling.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A guard for protecting a plant, comprising:
   a) a sheet of semi-rigid material having
      i) a top edge,
      ii) a bottom edge,
      iii) a first end extending between said top and bottom edges, and
      iv) a second end spaced from said first end; and
   b) fastening means formed on said sheet for fastening said first end in overlapping relationship with said second end at selectively variable locations relative to said second end, to form a tubular sheath having an adjustable diameter for surrounding said plant, said fastening means including
      i) a plurality of spaced apart female elements located at regularly spaced intervals across the entire length of said sheet; and
      ii) a plurality of male elements spaced at intervals corresponding to the spacing of said female elements, located in alternating relationship with said female elements across the entire length of said sheet, said male elements receivable by said female elements of said overlapping first end and said second end.

2. A guard according to claim 1, further comprising cut-out means opening along said bottom edge for increasing the flexibility of said bottom edge to allow an outward taper.

3. A guard according to claim 2, further comprising a plurality of openings in said flexible sheet for allowing air and sunlight to reach said plant through said sheath.

4. A guard for protecting a plant, comprising:
   a) a sheet of semi-rigid material having
      i) a top edge,
      ii) a bottom edge,
      iii) a first end extending between said top and bottom edges, and
      iv) a second end spaced from said first end; and
   b) fastening means for detachably securing said first end in overlapping relationship with said second end at selectively variable locations relative to said second end, to form a tubular sheath having an adjustable diameter, for surrounding said plant, said fastening means including
      i) a plurality of spaced apart apertures located at regularly spaced intervals across the entire length of said sheet between said first end and said second end; and
      ii) a fastener concurrently receivable by aligned apertures of said first end in overlapping relationship with said second end, said fastener including a post having a first end and a second end, said post having a diameter less than the diameter of said apertures;
   an enlarged, conical head formed at said first end of said post; and
   an enlarged flattened head formed at said second end of said post.

5. A guard according to claim 4, further comprising cut-out means opening along said bottom edge for increasing the flexibility of said bottom edge to allow an outward taper.

6. A guard according to claim 5, further comprising a plurality of openings in said flexible sheet for allowing air and sunlight to reach said plant through said sheath.

* * * * *